United States Patent [19]
Hasman et al.

[11] Patent Number: 5,526,338
[45] Date of Patent: Jun. 11, 1996

[54] METHOD AND APPARATUS FOR STORAGE AND RETRIEVAL WITH MULTILAYER OPTICAL DISKS

[75] Inventors: Erez Hasman, Kiron; Asher A. Friesem, Rehovot, both of Israel

[73] Assignee: Yeda Research & Development Co. Ltd., Rehovot, Israel

[21] Appl. No.: 402,227

[22] Filed: Mar. 10, 1995

[51] Int. Cl.⁶ ....................................... G11B 7/00
[52] U.S. Cl. ............................ 369/109; 369/94; 369/102; 369/112; 369/275.1; 369/44.23
[58] Field of Search ................................. 369/44.23, 109, 369/102, 94, 103, 99, 112, 116, 275.1, 275.3, 275.4; 365/124, 125

[56] References Cited

U.S. PATENT DOCUMENTS

| | | | |
|---|---|---|---|
| 5,202,875 | 4/1993 | Rosen et al. | 369/94 |
| 5,251,198 | 10/1993 | Strickler | 369/94 |
| 5,255,262 | 10/1993 | Best et al. | 369/275.1 |
| 5,373,499 | 12/1994 | Imaino et al. | 369/275.4 |
| 5,381,401 | 1/1995 | Best et al. | 369/275.1 |
| 5,408,453 | 4/1995 | Holtslag et al. | 369/44.23 |

OTHER PUBLICATIONS

Computer–Originated Aspheric Holographic Optical Elements—R. C. Fairchild et al, Opt. Eng. vol. 21 No. 1 (1982) pp. 133–140.

Depth Response of Conlocal Optical Microscopes—T. R. Corle, et al., Opts. Letters, vol. 11, No. 12 (1986) pp. 770–772.

Design of Wave Length–Division . . . , Y. Amitai Opts. Comm. (1993) pp. 24–28.

Analytic Design of Hybrid Diffractive—Refractive Achromats—N. Davidson et al, Appl. Opt. vol. 32, No. 25 pp. 4770–4774.

Efficient Multilevel Phase Holograms For $CO_2$ Lasers—E. Hasman, et al. Opt. Soc. Am.—Optics Letters (1991) pp. 423–425.

MultiFunctional Holographic Elements For Surface Meas.—E. Hasman, et al. Opt. Eng. vol. 31, No. 2, (1992) pp. 363–368.

Primary Examiner—Loha Ben
Attorney, Agent, or Firm—Mark M. Friedman

[57] ABSTRACT

A multilayer optical disk system, which includes an optical disk unit having a number of connected optical disks. A number of light sources, such as diode lasers, are used to provide a number of light beams of different wavelengths. A wavelength multiplexer combines the light beams into a single beam which is then axially dispersed so that light of different wavelengths are simultaneously focuses onto the different optical disks. A wavelength demultiplexer splits light reflected from the optical disks according to wavelength to produce separate beams which are then separately detected.

35 Claims, 8 Drawing Sheets

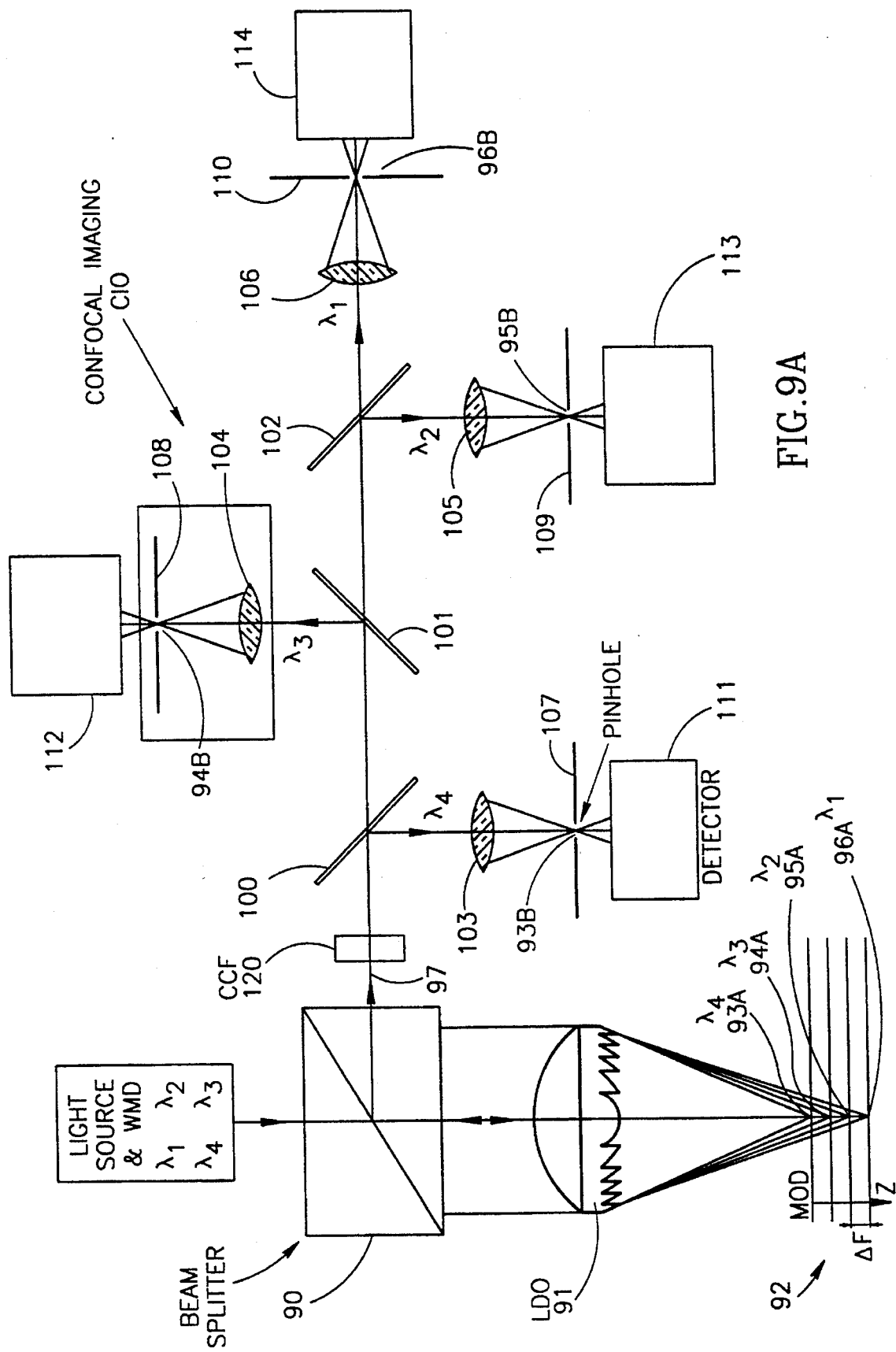

METHOD AND APPARATUS FOR STORAGE AND RETRIEVAL WITH MULTILAYER OPTICAL DISKS

FIELD AND BACKGROUND OF THE INVENTION

The present invention relates to optical storage disks, and, in particular, to methods and apparatus for the retrieval of high density information in optical storage disks with high readout bit-rate.

The density of optical memory is normally described in two dimensional formats and is typically quantified in bits per square millimeter. The upper limits on information density are set by the diffraction of light. Specifically, the minimum diameter of a light spot formed at a focal point is about $\lambda/(2NA)$, where $\lambda$ is the wavelength and NA is the numerical aperture of the focused beam. Consequently, the information density is approximately $(NA/\lambda)^2$ corresponding to $10^9$ to $10^{10}$ bits on one surface of a typical 4.7 inch (120 mm) diameter optical disk. Optical disks are available on which information may be stored on both sides of the disk. The description herein is equally applicable for both single-sided and double-sided optical disks.

Advances in computer technology call for increased memory capacity and shortened access time. Current work in the optical storage field is geared towards quadrupling the capacity of the disks by utilizing blue-green diode lasers. Significant improvement in memory capacity requires increasing the volume density of the storage medium. Presently, such storage density increases are achieved by exploiting optical tapes. However, optical tapes are serial access devices with limited access speed which greatly reduces the attractiveness of this approach relative to optical disks whose geometry makes it possible to use random access techniques.

The optical disk, as a two-dimensional optical storage device, is currently the most widespread physical format for optical storage. The volume data density of optical disks can be increased by adding a third physical dimension. This can be done by using a multilayer optical disk, i.e., by axially stacking a number optical disks. In order to utilize the third physical dimension, an unconventional optical head must be used.

Several stacked optical disk systems have been proposed. IBM Almaden Research Center of San-Jose, Calif., propose a unique volumetric method for increasing optical disk capacities which is disclosed in U.S. Pat. Nos. 5,202,875 and 5,255,262, incorporated herein be reference for all purposes as if fully set forth herein. The IBM approach involves bonding together individual disks in a stack with spacers provided between adjacent disks to define a gap between adjacent disks. At any one time, a movable lens in the optical disk drive focuses a laser on one surface of one of the disks in order to read data. The focus of the laser is changed repeatedly to sequentially read data from the various disk surfaces. Each disk, or at least all but the farthest disk from the laser source, must be partially transparent so that the laser can be used to read a disk which lies beyond one or more other disks. Each disk surface, however, must also be sufficiently reflective to allow the data to be read.

Unfortunately, there are several limitations in using the IBM approach. By increasing the number of disks, the signal to noise ratio (SNR) is generally reduced and the interlayer crosstalk becomes significant. Moreover, the time required to focus the optical head on the desired disk surface, which involves accelerating the head from a fixed position, displacing it, and decelerating the head to a new rest position, requires significant time and greatly limits the data access time of the device.

There is thus a widely recognized need for, and it would be highly advantageous to have, a method and apparatus which will alleviate the above limitations by providing multilayer optical disk storage with high volume storage capacity and high bit-rate readout of the stored data.

SUMMARY OF THE INVENTION

The present invention offers a three-dimensional optical disk storage with significantly decreased crosstalk (high signal to noise ratio), and greatly reduced access time (increased bit-rate readout).

The present invention is characterized in that two or more, and preferably all, of the disks are read simultaneously using a parallel readout. This approach offers a significant access time advantage over the movable lens approach described above, regardless of whether partially transparent disks or selective wavelength disks are used.

The present invention is of a novel three dimensional optical storage device which includes a multilayer optical disk. In one embodiment, the media of each layer are wavelength dependent, such that each layer may have high transmission for one wavelength or band of wavelengths and high reflectivity for a different wavelength or band.

The optical head of a system according to the present invention includes an incident light system which combines two or more light sources, which may be diode lasers, each light source emitting a beam of light of a different wavelength which is related to the selective wavelength media of the multilayer optical disk, for readout of the desired disk information.

The combining of several beams into a single beam, is effected using a suitable wavelength multiplexing device which may include dichroic beam combiners or a holographic/diffractive optical element.

The combined beam is focused on the multilayer optical disk using suitable axially dispersing optics, so that a multiplicity of axially displaced foci along the spinning axis of the disks are obtained, depending on the wavelengths of the various lasers source. The dispersing optics includes an on-axis diffractive lens or hybrid diffractive-refractive optical element. The beam from each source of a different wavelength, such as diode laser beams, is focused on a corresponding optical disk surface and is reflected back from the surface to produce a reflected beam which includes information related to the zone of the optical disk surface being read.

The reflected light is detected by a confocal configuration which gives accurate depth discrimination. In addition, the reflected light is discriminated by wavelength, using, for example, dichroic beam-splitters, prisms or off-axis diffractive elements (holographic elements), and is focused on a corresponding photodiode or photodiode array, which each photodiode detecting information stored on one of the optical disk surfaces. The detection is performed simultaneously on two or more layers, resulting in high bit-rate readout.

In order to radially scan a multilayer compact disk system according to the present invention it is proposed, in a preferred embodiment of the preset invention, to use a scan concept which obviates the need to displace the light source and the detection unit.

According to further features in an alternative embodiment of the present invention, the multilayer optical disk are partially transparent rather than being wavelength selective. The use of partially transparent disks simplifies the production process and lowers the cost of the system. However, everything else being equal, the use of such a system requires the use of higher power diode lasers and leads to some reduction in the signal to noise ratio. Use of confocal readout configuration results in adequate signal to noise ratio for a suitable number of disk.

In an alternative embodiment of the present invention, a bifocal focusing element is used for obtaining two focused spots on an optical disk device which includes two disks. The bifocal focusing element is based on a hybrid diffractive-refractive element. In this case, partially transparent layers are used. The readout also contains a confocal configuration so as to make it possible to retrieve information from the two layers simultaneously, with adequate signal to noise ratio.

BRIEF DESCRIPTION OF THE DRAWINGS

The invention is herein described, by way of example only, with reference to the accompanying drawings, wherein:

FIG. 9A illustrates a readout principle which is based on dichroic beam-splitters and confocal imaging optics;

DESCRIPTION OF THE PREFERRED EMBODIMENTS

The principles and operation of optical disk systems and methods according to the present invention may be better understood with reference to the drawings and the accompanying description.

Figure 1:
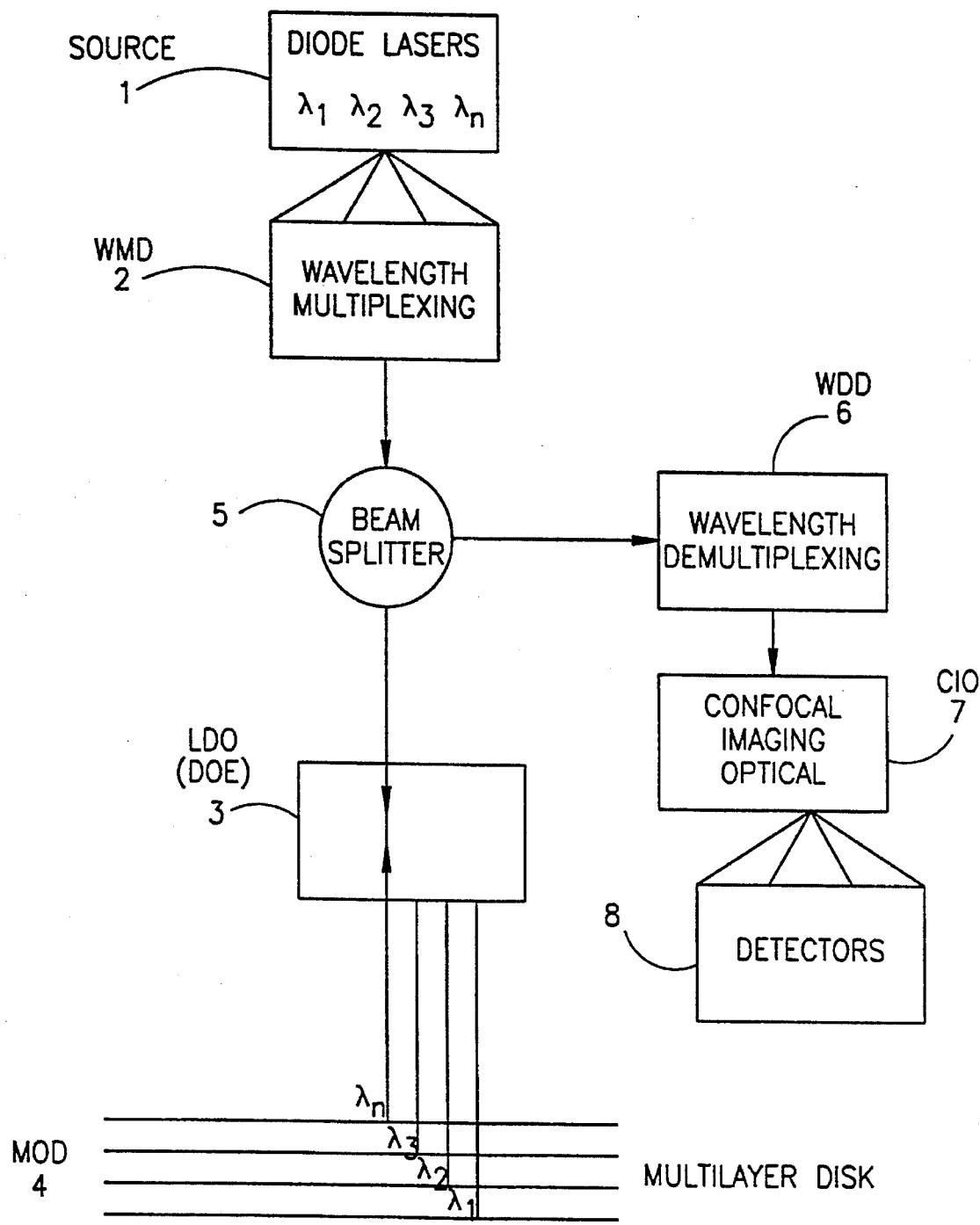
FIG. 1 is a block diagram of the three dimensional optical storage and readout system which is based on multi-wavelength light discrimination.

Referring now to the drawings, FIG. 1 shows a block diagram of a three dimensional optical storage system (3-DOSS) of the present invention. The 3-DOSS includes an optical head (driver) and a multilayer optical disk assembly (MOD) 4.

The optical head includes the illumination and the readout systems. The illumination system includes a light source 1, which is preferably supplied by a plurality of diode lasers, each emitting at a different wavelength. The illumination system further includes a wavelength multiplexing device (WMD) 2, for combining the laser beams into a single beam. Finally, the illumination system includes axially (or longitudinally) dispersing optics (LDO) 3, which may be in the form of an on-axis diffractive optical element (DOE) or a hybrid diffractive-refractive optical element.

The readout system consists of beam-splitter 5, which reflects the back reflected light in the direction of the wavelength demultiplexing device 6, designated by WDD; confocal imaging optic (CIO) 7, and detectors 8, for readout of the information simultaneously from all the layers.

A key feature of one embodiment of the present invention is the use of a plurality of diode lasers, or other light sources, each emitting at a different wavelength. Currently, many semiconductor diode lasers are available which span the entire visible spectrum and the near IR spectrum. Illustrative of such diode lasers are those sold by Spectra Diode Lab (U.S.A)—InGaAs lasers for wavelengths of 910–1020 nm, GaAlAs lasers for 780–860 nm and AlGaInP laser for 630–670 nm. Electromagnetic radiation of various wavelenghts may be used. Preferably, such radiation will be in the visible, ultraviolet and/or infrared ranges. For convenience, the term 'light' is used in the specification and claims, it being understood that the term 'light' as used herein is intended to cover all electromagnetic radiation and is not limited to the visible spectrum..

Also known are zinc selenide (ZnSe) diode lasers which generate blue-green beams and work is being conducted on 3–5 nitride compounds, such as gallium nitride, which have already been used in blue light-emitting diodes.

Frequency conversion, with nonlinear materials and novel techniques, of laser diode output at the near IR to the blue-green wavelength is also possible. Israel-Soreq Nuclear Research Center and its commercial arm, Isorad Ltd., developed a compact blue laser capable of a continuous output power of 3.6 mw at 427 nm by doubling a standard GaAs diode laser. Their nonlinear conversion device is based on an integrated KTP waveguide.

Any suitable assembly of light sources may be used with the present invention. The sources may be diode lasers with a large wavelength separation, for example, 50–100 nm, or a small range, for example, 10–50 nm. For example, in the wavelength multiplexer illustrated in FIG. 2, the diode lasers 21, 22, 23, 24 (in this example only four diodes are used) can be, respectively, a Sanyo SDL-3038-011 laser with wavelength $\lambda_1$=635 nm, a Toshiba TOLD 9140 laser with wavelength $\lambda_2$=680 nm, a Sharp LT025MD laser with wavelength $\lambda_3$=780 nm and a Sharp LT015MD laser with wavelength $\lambda_4$=830 nm. Preferably, the preferred diode lasers are polarized.

Various means may be used in the wavelength multiplexer to combine the light beams from the various sources. For example, one could utilize dichroic beam-splitters (as in FIGS. 2–3) or a holographic optical element (as in FIG. 4).

The dichroic beam-splitters selectively reflect and transmit light depending on the wavelength of the incident light. Dichroic beam-splitters (or interference filters) are typically produced using multilayer thin film coating technology. Illustrative of dichroic beam-splitters which are commercially available are those produced by Elop Electrooptics Industries Ltd., Israel, or those produced by Melles Griot (similar to 03-BDS product series).

Interference filters are of two basic types—edge filters and bandpass filters. Edge filters can be a short-wave pass or a long-wave pass filter. A long-wave pass filter transmits longer wavelengths and reflects shorter wavelengths while a short-wave pass filter transmits shorter wavelengths and reflects longer wavelengths. A bandpass filter transmits wavelengths in a desired wavelength interval, while reflecting wavelengths which are outside the interval. The transmission and reflection of interference filters also depends on the angles of incidence.

Figure 2:
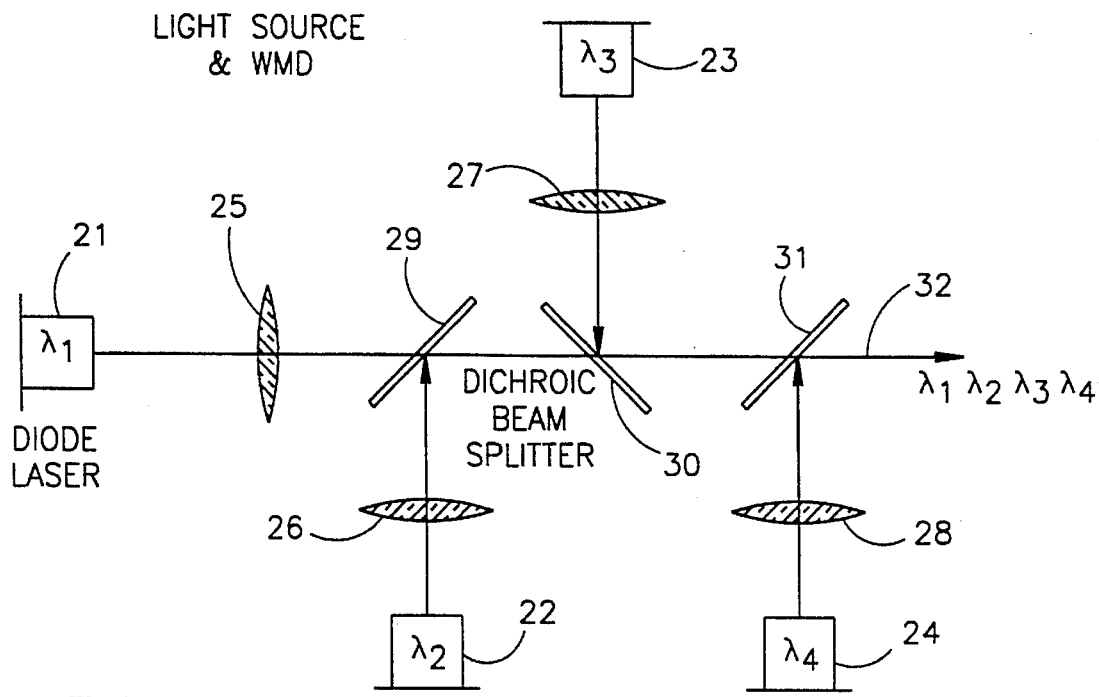
FIG. 2 illustrates a wavelength multiplexing device which is based on dichroic beam-splitters.

In the preferred embodiment of a wavelength multiplexer illustrated in FIG. 2, the beams emitted by diode lasers, 21, 22, 23, 24 and passed through collimating lenses 25, 26, 27 and 28 are combined by dichroic beam-splitters of the edge filter type 29, 30 and 31. The edge filters are short wavelength pass, where $\lambda_1<\lambda_2<\lambda_3<\lambda_4$. For example, the dichroic beam-splitter 30 transmits the light of $\lambda_1$ and $\lambda_2$ and reflects the light of $\lambda_3$. The combined beam travels along the optical axis 32, where it is assumed to be polarized at the "p" plane. The polarization makes it possible to achieve higher operating efficiencies.

Figure 3:
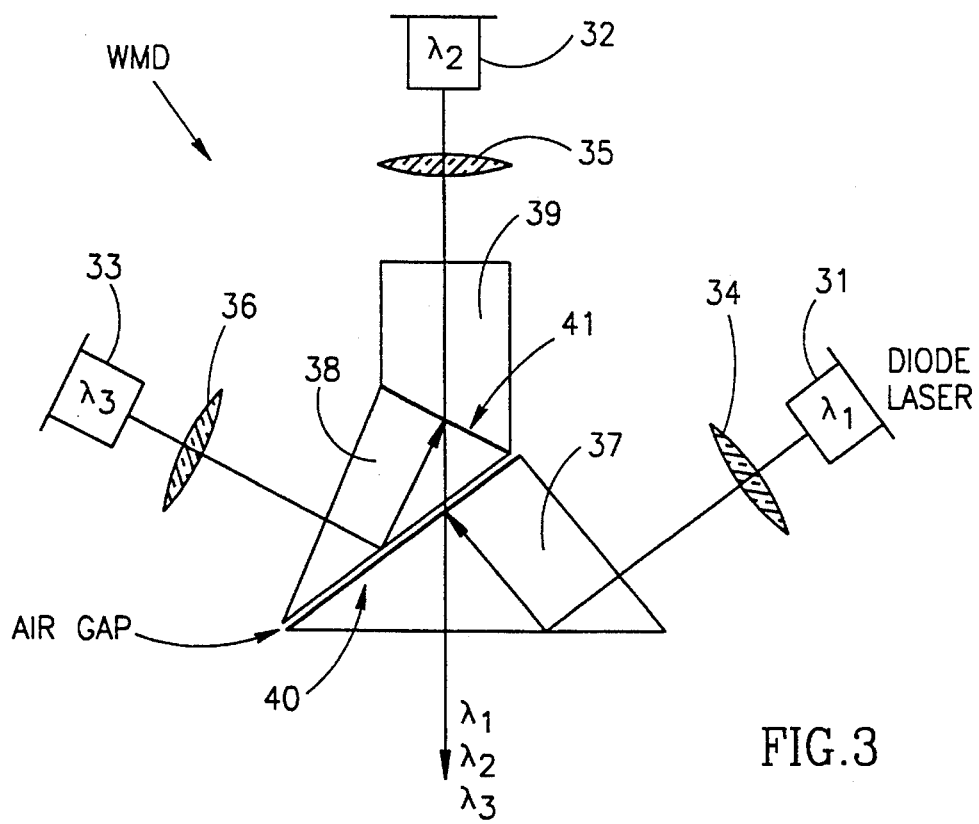
FIG. 3 illustrates a wavelength multiplexing device which is based on dichroic prisms assembly.

FIG. 3 is a schematic depiction of another embodiment of a wavelength multiplexer which may be used in the present invention. The multiplexer of FIG. 3 uses a dichroic prisms assembly with wavelenght selective coatings, such as that produced by Optec s.r.l. (Via Canova 10 20017 RHO Italy). The Optec device effects wavelength separation using an assembly of prisms for either three wavelengths (Optec product number DS-2787.102) or four wavelengths (Optec product number DS 193.101), where the optional wavelength separation can be in a bandpass of 10 nm. The three-wavelength version of the Optec device is shown in FIG. 3.

In FIG. 3 the light sources are, for example, three diode lasers 31, 32, 33 and their respective collimating lenses 34, 35 and 36. The emission wavelengths of these lasers preferably satisfy the relationship $\lambda_1<\lambda_2<\lambda_3$. The Optec wavelength multiplexer of FIG. 3 includes three prisms 37, 38 and 39. The surfaces between prisms 37 and 38 and between prisms 38 and 39 are coated with suitable interference filters 40 and 41. Here, the dichroic film, 40, reflects the $\lambda_1$ light and transmits the rest, whereas the dichroic film, 41, reflects $\lambda_3$ and transmits $\lambda_2$. A thin air gap (about 0.03 mm of thickness), between the prisms, 37 and 38, is necessary in order to achieve total internal reflection of the $\lambda_3$ light. The assembly of prisms of FIG. 3 is more convenient as a wavelength multiplexer than the configuration of FIG. 2 which includes individual dichroic beam-splitters. Moreover, the use of small incidence angles which is possible with the configuration of FIG. 3 substantially reduces polarization problems.

Figure 4:
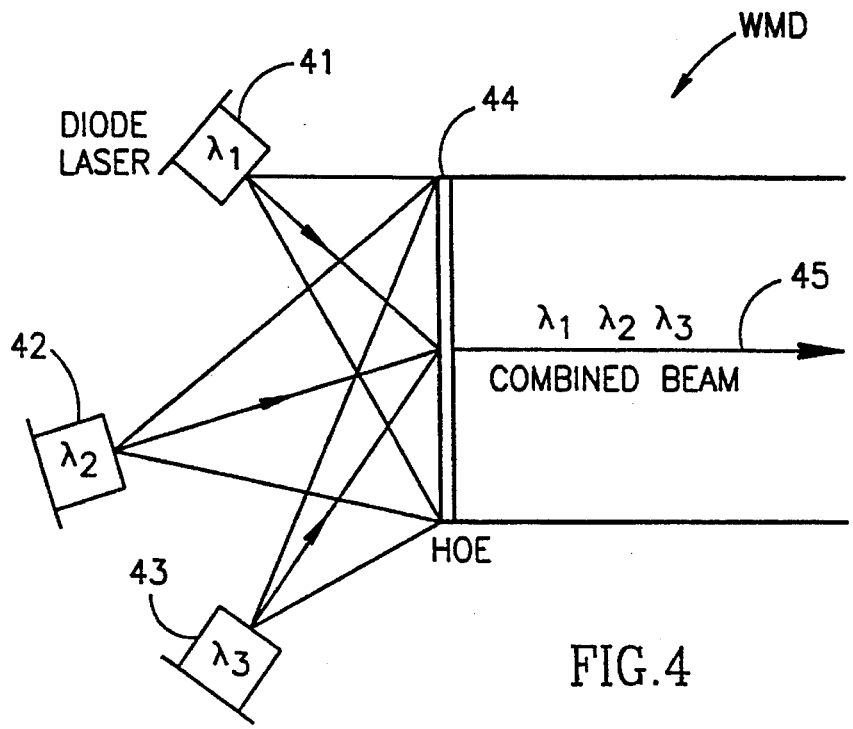
FIG. 4 illustrates a wavelength multiplexing device which is based on holographic optical element.

FIG. 4 illustrates a wavelength multiplexing device WMD which is based on a holographic optical element (HOE). It is possible to combine a plurality of diode lasers using a single HOE. Furthermore, thick holograms can be realized with diffraction efficiencies approaching 100%, with 70–95% being routinely achieved. In addition, the holographic multiplexers can operate with parallel light, requiring the use of external lenses for the diode lasers. Alternatively, the HOE can operate directly with the diverging wave from the diode lasers, thereby performing the functions of collimation, wavelength combination and reshaping the output wavefront with a single element.

In the embodiment illustrated by FIG. 4, the wavelength multiplexing device is in the form of the HOE 44 which combines, for example, three diode lasers 41, 42, 43 having wavelength $\lambda_1$, $\lambda_2$, $\lambda_3$, respectively. It is possible to use phase holographic film such as bleach silver (AgHal) emulsions, dichromated gelatin emulsion or polymeric films (commercially available from Eastman Kodak, Agfa and Du Pont) for achieving high diffraction efficiency.

The combined beam ($\lambda_1$, $\lambda_2$, $\lambda_3$) is denoted by 45. It must be emphasized here that the performance of the HOE is ideal when the readout geometry and the wavelength are identical to the recording geometry and wavelength. In the absence of such identity it may be necessary to resort to computer generated holograms (see, R. C. Fairchild and J. R. Fienup, "Computer originated aspheric holographic optical elements", Opt. Eng. 21,133 1982).

Several companies produce holographic/diffractive elements. Among them are Kaiser Optical Systems Inc. and POC Physical Optics Corporation of the U.S.A. It is also possible to realize wavelength multiplexing using planar optics configurations which are based on a substrate-mode holographic elements (see, Y. Amitai, "Design of wavelength multiplexing/demultiplexing using substrate-mode holographic elements, Opt. Comm. 98, 24, 1993), or by diffractive elements (kinoform).

Figure 5:
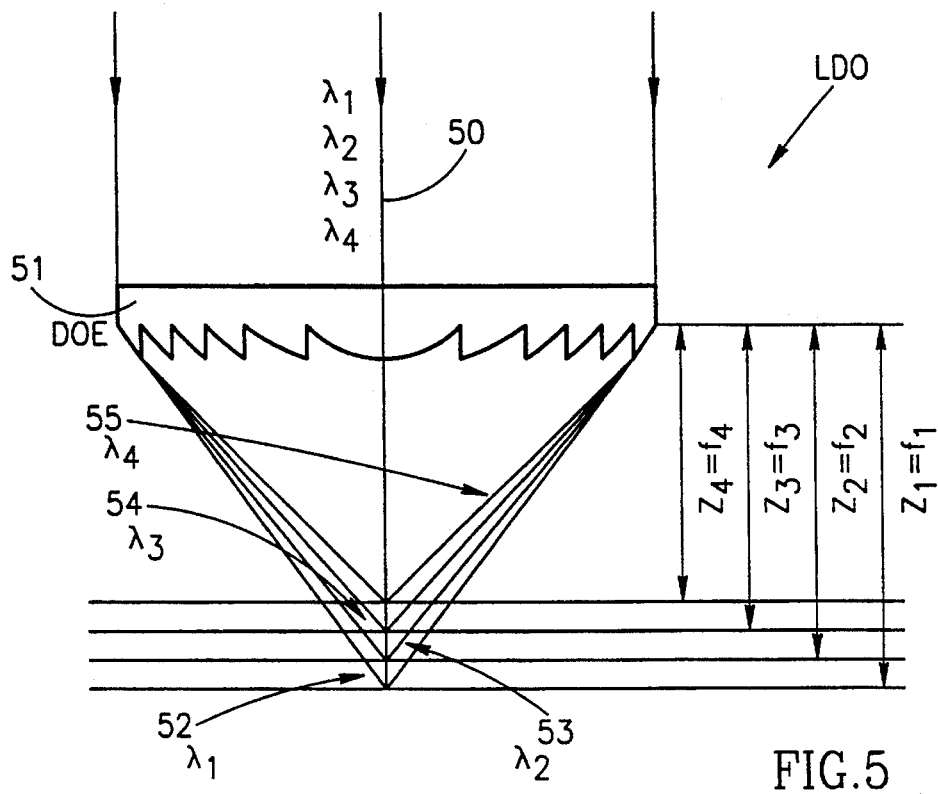
FIG. 5 illustrates axially dispersing optics based on an on-axis diffractive optical element.

FIG. 5 illustrates an example of axially dispersing optics for use in the present invention. The axially dispersing optics focus the combined beam on the appropriate portion of the multilayer optical disk. Any suitable axially dispersing optics may be used. Preferably, the axially dispersing optics is an on-axis diffractive optical element (DOE) (as in FIG. 5), or a hybrid diffractive-refractive optical element (as in FIG. 6).

The diffractive optical element can be generated as a computer-generated component using lithography, etching or thin film deposition. Optical elements based on diffraction were known long before the advent of lasers and before the introduction of holograms Dennis Gabor. The first diffraction based lens was a Fresnel Zone Plate constructed by Lord Rayleigh in 1871. However, the full potential of diffraction-based optical elements could only be exploited following the development of the lasers.

Two independent issues are associated with diffractive optical elements. One involves the design of the optimal two-dimensional phase function, $\phi$, for obtaining the desired optical performance. The second problem is the optimization of the diffraction efficiency.

When a wave impinges on a diffractive element, various diffracted orders are generated with typically only one of these being desired. The ratio of diffracted power into the desired order (in general, the first diffracted order) over the incident power is knows as the diffraction efficiency. In order to ensure that the diffraction efficiency is high, it is necessary to record the diffractive optical element in special materials and/or to exploit special recording techniques. The diffractive optical elements can be used for aberration correction, wavefront shaping and scanning, as well as for beam focusing, collimation, deflection and dispersing optics.

It is possible to obtain a formula for the wavelength dependence of the focal length for a diffractive optical element. This can be done as follows: For an idealized quadratic DOE, the transmission function t(x,y) is given by, $$t(x,y;\lambda)=\exp(i\phi)=\exp[-i\pi(x^2+y^2)/(\lambda_0 f_0)] \quad \{1\}$$

where x and y are the coordinates in the plane of the thin lens, $\lambda_0$ is the wavelength of the light, and $f_0$ is the focal length of the lens. However, when such a diffractive optical element is illuminated using another wavelength, $\lambda$, one obtains the well known result that the focal length $f(\lambda)$ is given by, $$f(\lambda)=(\lambda_0/\lambda)f_0 \quad \{2\}$$

This equation indicates that the focal length is inversely proportional to the wavelength which is the desired axially dispersion of the DOE.

If one assumes that the diffractive optical element with quadratic phase function is illuminated with the combined beam 50, which is made up of wavelengths $\lambda_1$, $\lambda_2$, $\lambda_3$, $\lambda_4$ where $\lambda_1<\lambda_2<\lambda_3<\lambda_4$, the result is several converging beams, each focused on a different plane. The diffractive optical element is designed to focus the beam of wavelength $\lambda_1$ at the focal length of $f_1$, 52, so the wavelength $\lambda_2$ is focused on $f_2=f_1\lambda_1/\lambda_2$, 53; wavelength $\lambda_3$ is focused on $f_3=f_1\lambda_1/\lambda_3$, 54, and wavelength $\lambda_4$ is focused on $f_4=f_1\lambda_1/\lambda_4$, 54. In this example the layers of the optical disk are placed at $z_1=f_1$, $z_2=f_2$, $z_3=f_3$, $z_4=f_4$. Utilizing a diffractive optical element with quadratic phase function, it is possible to obtain the distance between two adjacent focal planes by the relation, $$\Delta f=\Delta z=f_0(\Delta\lambda/\lambda_0) \quad \{3\}$$

A classical objective lens for a compact disc player typically has a focal length of 8 mm and a diameter of 7.5 mm (NA=0.45). Substituting in Eq. {3} $\Delta\lambda$=50 nm, $\lambda_0$=500 nm ($\Delta\lambda/\lambda$=0.1) and $f_0$=8 mm, the result is $\Delta f$=800 μm. In order to reduce $\Delta f$ while keeping the same effective focal length, it is necessary to combine diffractive and refractive elements. If one assumes that the multiwavelength light illuminates a refractive lens with a focal length $f_r(\lambda)$ and a diffractive optical element with a focal length $f_d(\lambda)$ in cascade. Assuming negligible separation between the refractive and diffractive elements, we resort to a simple lens combination equation, $$1/F(\lambda)=1/f_d(\lambda)+1/f_r(\lambda) \quad \{4\}$$

where $F(\lambda)$ is the desired focal distance of the combined lens. Using Eq. {2} and neglecting the dispersion of the refractive lens $f_r(\lambda)=f_r$, the more general relation to Eq. {3} is obtained as follows:

$$\Delta F=(F_0/f_0)[F_0(\Delta\lambda/\lambda_0)] \quad \{5\}$$

where $F_0=F(\lambda=\lambda_0)$, and $f_0=f_d(\lambda=\lambda_0)$. For example, if one is interested in $\Delta F=\Delta z$=200 μm, and with $\Delta\lambda/\lambda$=0.1 and $F_0$=8 mm, then Eq. {5} yields $f_0$=32 mm and $f_r$=10.6 mm.

For realizing a hybrid combination of refractive-diffractive lens, it is possible to use either separate lenses or a single hybrid diffractive-refractive element. The single hybrid configuration is particularly advantageous because of its relative simplicity such that the diffractive element can be recorded directly on the planar surface of a plano-convex refractive lens using conventional photolithographic techniques. Indeed, by utilizing the hybrid diffractive-refractive lens, it is possible to design the grating function for minimizing the achromatic aberrations (see, N. Davidson, A. A. Friesem, and E. Hasman, "Analytic design of hybrid diffractive-refractive achromats" Applied Optics 33, 4770, 1993).

Figure 6:
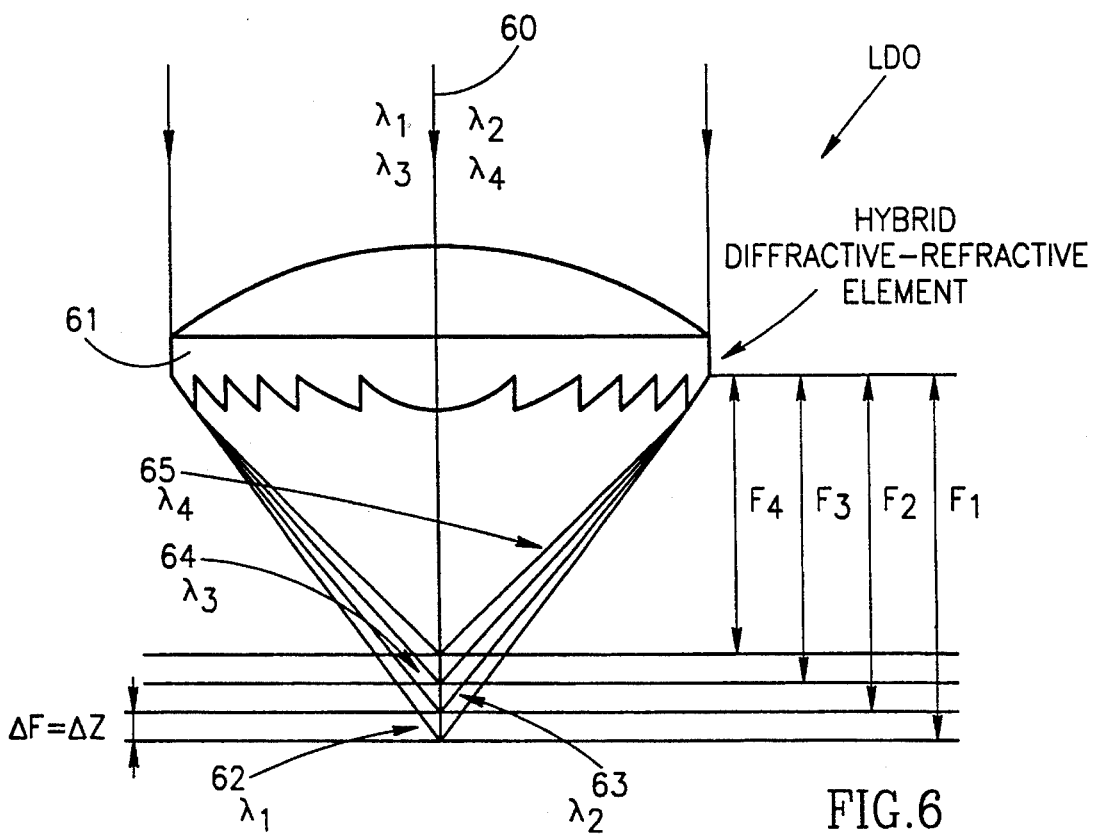
FIG. 6 illustrates axially dispersing optics based on an hybrid diffractive-refractive optical element.

FIG. 6 illustrates a hybrid lens 61 which is illuminated with the combined beam, 60, containing light of wavelengths $\lambda_1$, $\lambda_2$, $\lambda_3$, $\lambda_4$. The hybrid lens 61 includes a plano-convex refractive lens with a diffractive element (kinoform) on the planar surface. The hybrid lens 61 serves to focus converging beams $\lambda_1$ 62, $\lambda_2$ 63, $\lambda_3$ 64, $\lambda_4$ 65.

High diffraction efficiencies for diffractive optical elements can be obtained with kinoforms which are constructed as surface relief gratings, with grooves having a graded shape. Indeed, the diffraction efficiencies of kinoforms having blazed relief gratings can reach 100 percent. An early fabrication process for obtaining the desired surface relief involves a single photomask with variable optical density for controlling the etching rate of some substrate. Unfortunately, such a process does not provide the required accuracies for controlling the graded shape and the depth of the surface relief grooves. In a more suitable process, the single photomask with the variable density is replaced by a multiplicity of simpler binary photomasks so the graded shape is approximated by multilevel binary steps. To ensure that high diffraction efficiencies are obtained, the errors due to the depth and width of the step levels must be taken into account, (E. Hasman, N. Davidson and A. A. Friesem, "Efficient multilevel phase holograms for $CO_2$ lasers" Opt. Lett. 16, 423, 1991).

Figure 7:
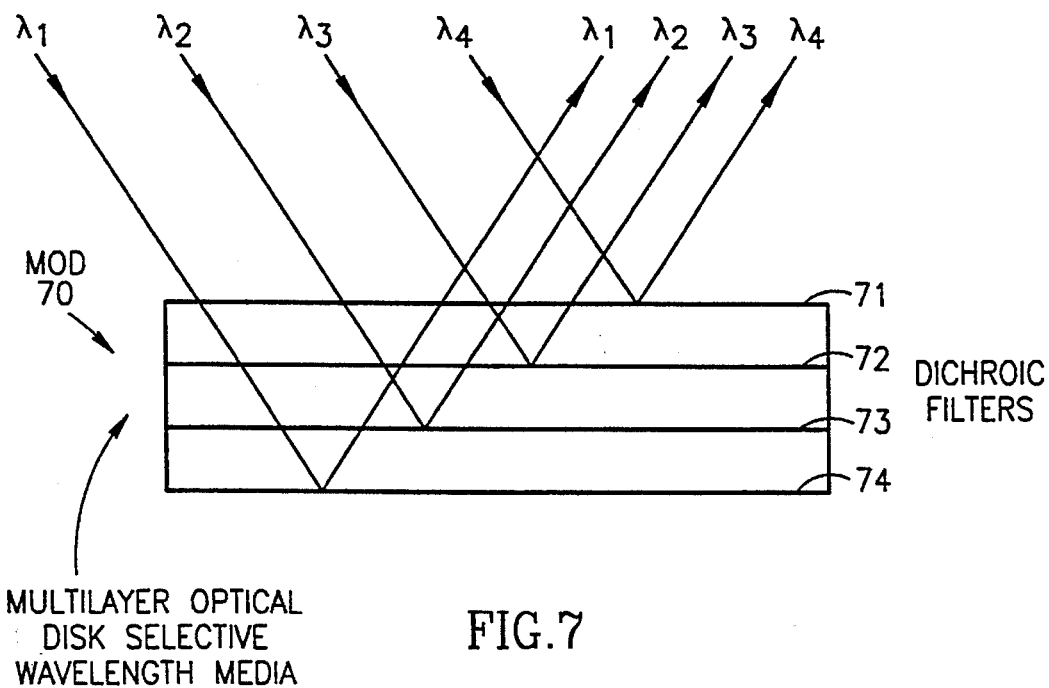
FIG. 7 illustrates a multilayer optical disk which is based on selective wavelength media.

FIG. 7 illustrates a preferred embodiment of the multilayer optical disk assembly (MOD), 70. The MOD 70 includes a number of discrete disks or layers, which may resemble, or be identical to, conventional optical disks with conventional phase information. In the basic embodiment of the present invention each of the layers is made of a selective wavelength medium. In FIG. 7 the dichroic filters are short wavelength pass. For example, assume the MOD is illuminated with light of wavelengths $\lambda_1$, $\lambda_2$, $\lambda_3$, $\lambda_4$, where $\lambda_1<\lambda_2<\lambda_3<\lambda_4$. The upper layer, denoted by 71, reflects the light of wavelength $\lambda_4$ and transmits light of wavelengths $\lambda_3$, $\lambda_2$, $\lambda_1$. The layer 72 reflects the light of wavelength $\lambda_3$ and transmits that of wavelengths $\lambda_2$ and $\lambda_1$. The layer 73 reflects light of wavelength $\lambda_2$ and transmits that of wavelength $\lambda_1$. Finally, the layer 74 reflects light of wavelength $\lambda_1$.

It is possible to form a selective wavelength medium using dichroic thin film coating technology. The thickness of each layer can be hundreds of microns.

Figure 8:
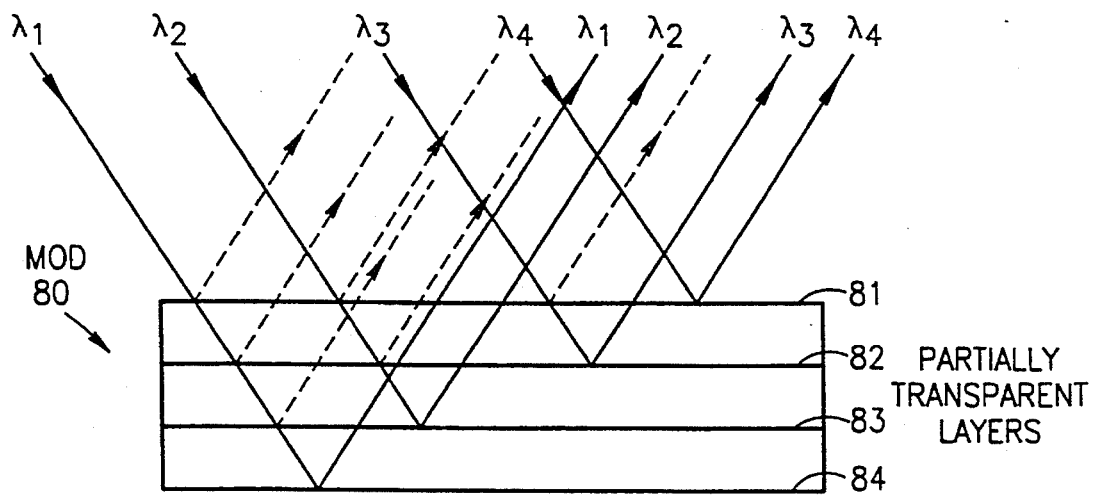
FIG. 8 illustrates a multilayer optical disk which is based on partially transparent layers.

FIG. 8 illustrates a second embodiment of an MOD 80 according to the present invention. In this embodiment the layers are partially transparent rather than being wavelength selective, as in the basic embodiment. Partially transparent layers were disclosed in U.S. Pat No. 5,255,262 which was described above. In this embodiment each of layers 81, 82, 83, 84 partially reflects the incidence beams. It must be emphasized that in this case too, light of a number of wavelengths is used with each wavelength light being focused on a different layer. Thus, light of wavelength $\lambda_1$ is focused on layer 84, light of wavelength $\lambda_2$ is focused on 83, light of wavelength $\lambda_3$ is focused on 82, and light of wavelength $\lambda_4$ is focused on the upper layer 81.

Regardless of whether a wavelength selective (FIG. 7) or partially transparent (FIG. 8) MOD is used, the data surfaces are typically ROM (Read Only Memory) which are formed directly into the substrate at the production phase. However, it is possible to coat the substrate with a suitable writable optical storage film such as, for example, WORM (Write Once Read Many) or one of the various erasable optical storage films such as phase change or magneto-optical (see, U.S. Pat No. 5,255,262). In order to realize a CD-WORM, it is necessary to finely tune and balance the absorption of the layers for the writing mode. The readout mode can be effected using low optical power, whereas the writing mode can be accomplished using high optical power. A non-linear absorption film can be used in this case, such as, for example, a tellurium-selenium alloy.

In FIG. 9A, the collimated beam is focused on the multilayer optical disk (MOD) by utilizing axially dispersing optics, 91, which results in focus multiplexing on the MOD, 92, as a function of the source wavelengths. The focused spots of the $\lambda_4$, $\lambda_3$, $\lambda_2$, $\lambda_1$ are denoted 93A, 94A, 95A, and 96A, respectively.

The backwards reflected light is directed by a beam-splitter, 90, toward the output, where the reflected light is laterally dispersed and focused on the detectors 111, 112, 113, and 114. The lateral dispersion, or wavelength demultiplexing, can include, for example, dichroic beam-splitters (FIG. 9A), a prism, or holograms/diffractive optics (FIG. 10). The wavelength demultiplexing device is based on the same principle as the wavelength multiplexing device illustrated in FIGS. 2–4.

In FIG. 9A, reflected beams, 97, are separated by edge filter type dichroic beam-splitters 100, 101, 102. In the case of $\lambda_1 < \lambda_2 < \lambda_3 < \lambda_4$ the dichroic plates are short wavelength pass (see FIG. 2). For instance, the dichroic beam-splitter, 100, transmits lights of wavelengths $\lambda_1$, $\lambda_2$ and $\lambda_3$ and reflects light of wavelength $\lambda_4$. The reflected collimated beam of $\lambda_4$ is focused by the objective lens 103 to spot 93B, where a pinhole 107 is located. It must be emphasized that the spot 93B is the image of spot 93A, (while spots 94B, 95B, 96B are the images of 94A, 95A, 96A, respectively). Detector, 111, the aperture of which is limited by the pinhole, detects all the light passing through this pinhole, and similarly for pinholes 108, 109, 110 and their detectors 112, 113, 114, respectively.

The pinhole is utilized as a spatial filter for spatially filtering the reflected light and transferring it to the detector, while rejecting stray, background and scattered (reflected) light from the unwanted layers. In the example of FIG. 9A, only the reflected spherical wave from focused spot 93A is imaged to a non-aberrated spherical wave converging to a small focused spot 93B, which will pass through the pinhole. The reflected light which does not form the exact focused spot 93A yields aberrated spherical waves, resulting in a large aberrated spot 93B, most of which will be blocked by the pinhole. Thus, the detected light level will be negligible for the undesired light.

The configuration with the pinhole illustrated above, is known as a confocal configuration and provides true depth discrimination which improves the signal to noise ratio (see, E. Hasman, N. Davidson and A. A. Friesem, "Multifunctional holographic elements for surface measurements" Opt. Eng. 31, 363, 1992). The use of a confocal arrangement makes it possible to achieve a sufficiently high signal to noise ratio for use with a non-wavelength selective multi-level optical disk, such as that described in FIG. 8.

The intensity distribution at the pinhole plane 93B (in the center), as a function of the axial coordinate z at the layers planes (MOD) around the focused spot 93A can be approximately written, in the pseudo-paraxial region, in the particular case, where the NA of lens 91 is the same as 103, as, $$I(z) = \{\sin[kz(1-\cos\alpha)]/kz(1-\cos\alpha)\}^2 \qquad \{6\}$$

where k is the wave number, $k=2\pi/\lambda$, $\lambda$ is the wavelength and $\sin(\alpha)$ is the numerical aperture, NA, of the image-forming objective, (T. R. Corle, C. H. Chou and G. S. Kino "Depth response of confocal optical microscopes", Opt. Lett, 11, 770, 1986).

In Eq. {6}, the intensity drops to its half-width for $kz(1-\cos\alpha) \approx 1.39$. The full width at half-maximum (FWHM) is given by, $$\delta z = FWHM \approx 0.45\lambda/(1-\cos\alpha) \qquad \{7\}$$

$\delta z$ is the typical depth response of the confocal readout system (using pinhole diameter of the order of the diffraction limit spot size $\approx \lambda/2NA$). The confocal arrangement makes it possible to detect a single layer which is not obscured by the glare signal from the other layers. For example, in Eq. {7}, substituting $\lambda \approx 0.5$ μm and $\sin(\alpha) = NA \approx 0.45$, results in $\delta z \approx 2$ μm, whereas the distance separation between adjacent layers is hundreds of microns.

Figure 9B:
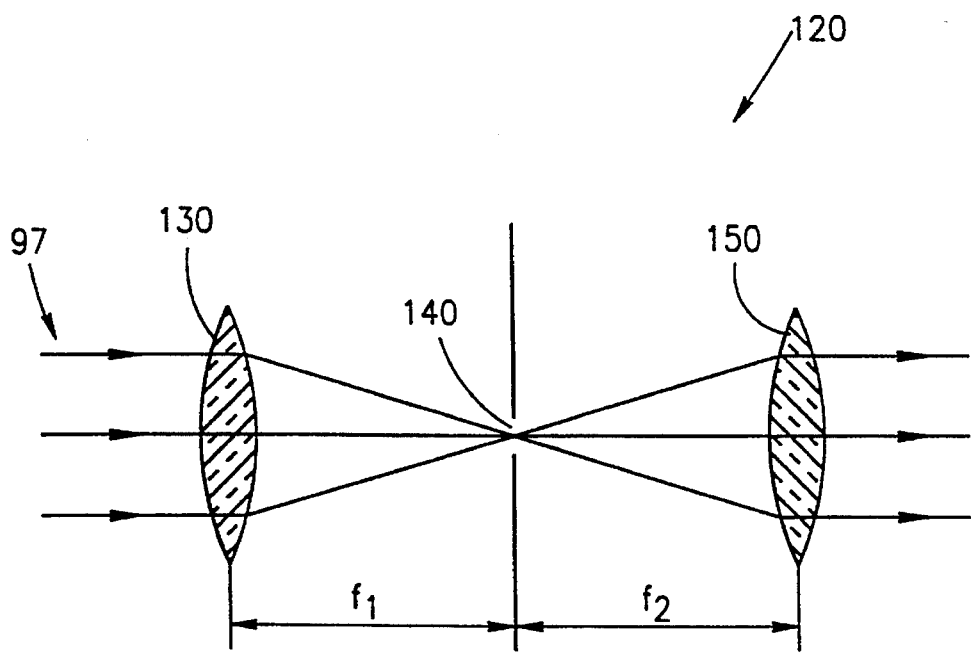
FIG. 9B illustrates a Common Confocal Filter operation.
Figure 10:
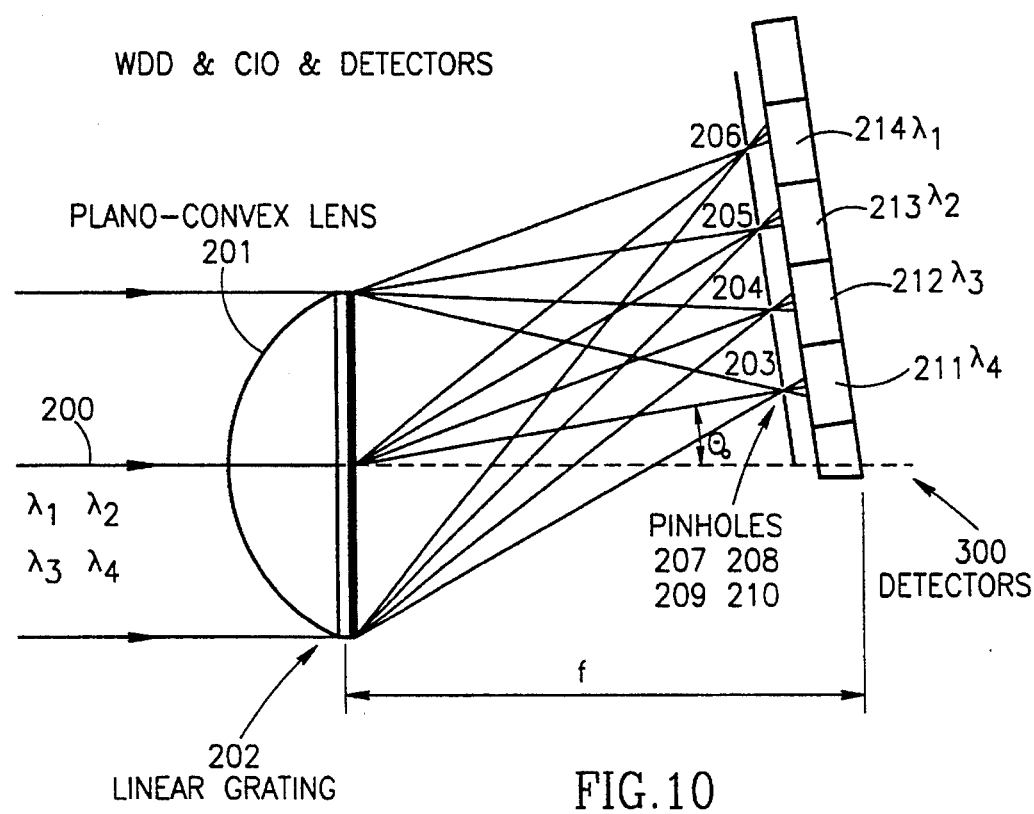
FIG. 10 illustrates a readout principle which is based on a combined diffractive-refractive element and the confocal technique.

An alternative way for screening out the unwanted reflected light and leading to true depth discrimination is to utilize a Common Confocal Filter (CCF) 120 (FIG. 9B). It is possible to use only the CCF 120, instead of the pinholes 108, 109, 110, or to use both of them, in order to achieve higher signal to noise ratio.

FIG. 9B illustrates one embodiment of a common confocal filter. The CCF is based on a telescope configuration, where a pinhole is inserted at the Fourier plane for blocking the uncollimated light (low spatial-frequencies pass filter). The CCF includes a first lens 130 with a focal length $f_1$, a blocking pinhole 140, and a second lens 150 with a focal length $f_2$. The distance between the two lenses is $f_1+f_2$, where the pinhole (spatial filter) is located at a distance $f_1$ from the first lens 130. The preferred pinhole diameter is of the order of the diffraction limit spot size at the pinhole plane. Use of the CCF exploits the confocal technique and reduces the interlayer signals, or crosstalk.

As described above, it is possible to carry out wavelength demultiplexing by exploiting a holographic optical element (as in FIG. 4) or a diffractive optical element, such as a kinoform or blazed grating. FIG. 10, illustrates yet another embodiment of a wavelength demultiplexing device which is based on a combination of a refractive focusing lens and a linear grating of the kinoform type.

The linear grating with a period $\Lambda$ diffracts the incident beam (with incidence angle is taken as zero) to output angle $\Theta_0$, according to the diffraction relation, $$\sin\Theta_0 = \lambda/\Lambda \qquad \{8\}$$

The combined element (the lens and the grating) yields spherical waves converging to points $x_i$, $$x_i = (\lambda/\Lambda)f \qquad \{9\}$$

where f is the focal distance of the refractive lens. The lateral separation between the adjacent wavelength is given by, $$\Delta x = (\Delta\lambda/\Lambda)f \qquad \{10\}$$

The combined beam, 200, illustrated in FIG. 10, passes through the refractive lens 201, and the linear grating 202. The result is converging spherical waves focused at a point corresponding to the wavelength, (Eq. {9}). The beams of wavelengths $\lambda_1$, $\lambda_2$, $\lambda_3$, $\lambda_4$ are focused to spots 203, 204, 205, 206, respectively. For exploiting the confocal technique, pinholes are placed at the focused spots 207, 208, 209, 210. For this purpose, it is possible to use a single mask with pinholes. The lights which pass through the pinholes are detected by a detector array, 300, (the detectors are denoted 211, 212, 213, 214). Inserting a microlens array between the pinholes and the detector array can reduce the optical crosstalk between adjacent detectors and improve the power collection efficiency of the detectors. For instance, using a lens with a focal distance f=100 mm and a linear grating where the period is $\Lambda$=50 µm and $\Delta\lambda$=50 nm, then Eq. {10} yields $\Delta x$=100 µm, which corresponds to a typical spacing in a photodiode array.

It is practically possible to accomplish the combined element according to the hybrid method, either by recording the diffractive element directly on the planar surface of a plano-convex refractive lens with multilevel photolithography or by realizing a directly off-axis diffractive element with a grating function of spherical and linear terms.

It must be emphasized that in this embodiment too, it is possible to use the CCF (described in FIG. 9A, 9B), instead of the pinholes 207, 208, 209, 210, or to utilize both of the CCF and pinholes.

Figure 11:
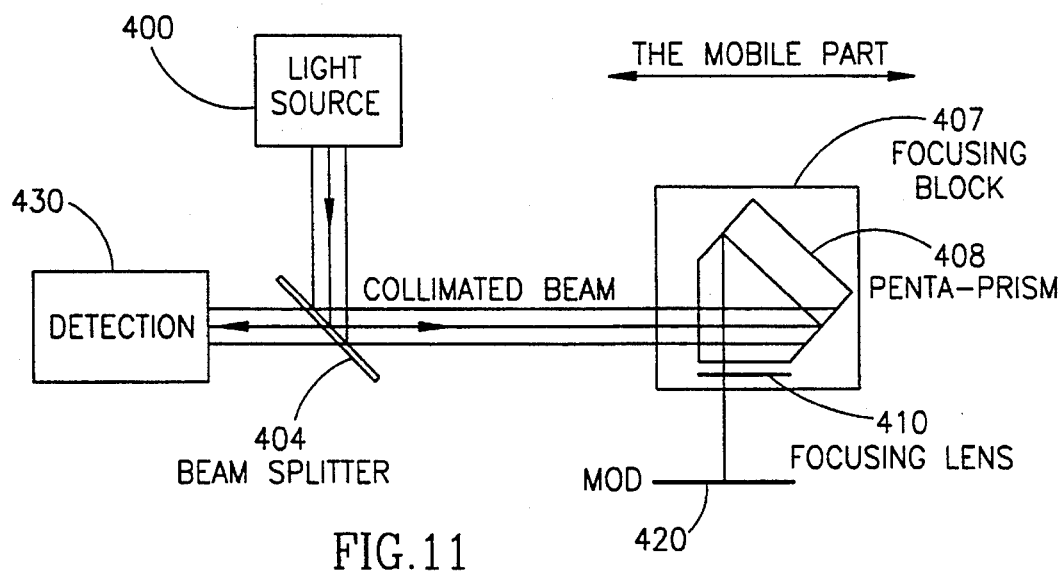
FIG. 11 illustrates a proposed scanning configuration.

In order to read-out the MOD information, it is necessary to scan the disk surfaces in the radial direction as the disk assembly is rotated about its axis. It will readily be appreciated that in a device according to the present invention the total weight of the readout components increases as the number of optical disk layers is increased. Hence, it may be somewhat difficult and slow to radially move the readout system. In order to overcome this potential difficultly, a new scanning configuration is proposed. The scanning configuration is illustrated in FIG. 11.

The readout system includes a light source 400, emitting a collimated beam which is reflected by a beam-splitter 404, towards the focusing block 407. The focusing block 407 is mobile in the radial direction, while the other components are stationary. The focusing block 407 includes any suitable optics, such as, for example, a penta prism 408 (as in FIG. 11), a regular prism (not shown) or a mirror reflecting at right angle (not shown). The focusing block 407 also includes the axially dispersing optics 410.

The penta prism is the preferred embodiment and is less sensitive to vibrations. The reflected beams are focused on MOD 420. The backwards reflected light is detected by detection block 430, which includes splitters, confocal imaging and detectors. Use of such a configuration renders the mobile portion of the system sufficiently lightweight to allow rapid radial scanning without adversely affecting the readout rate.

Figure 12:
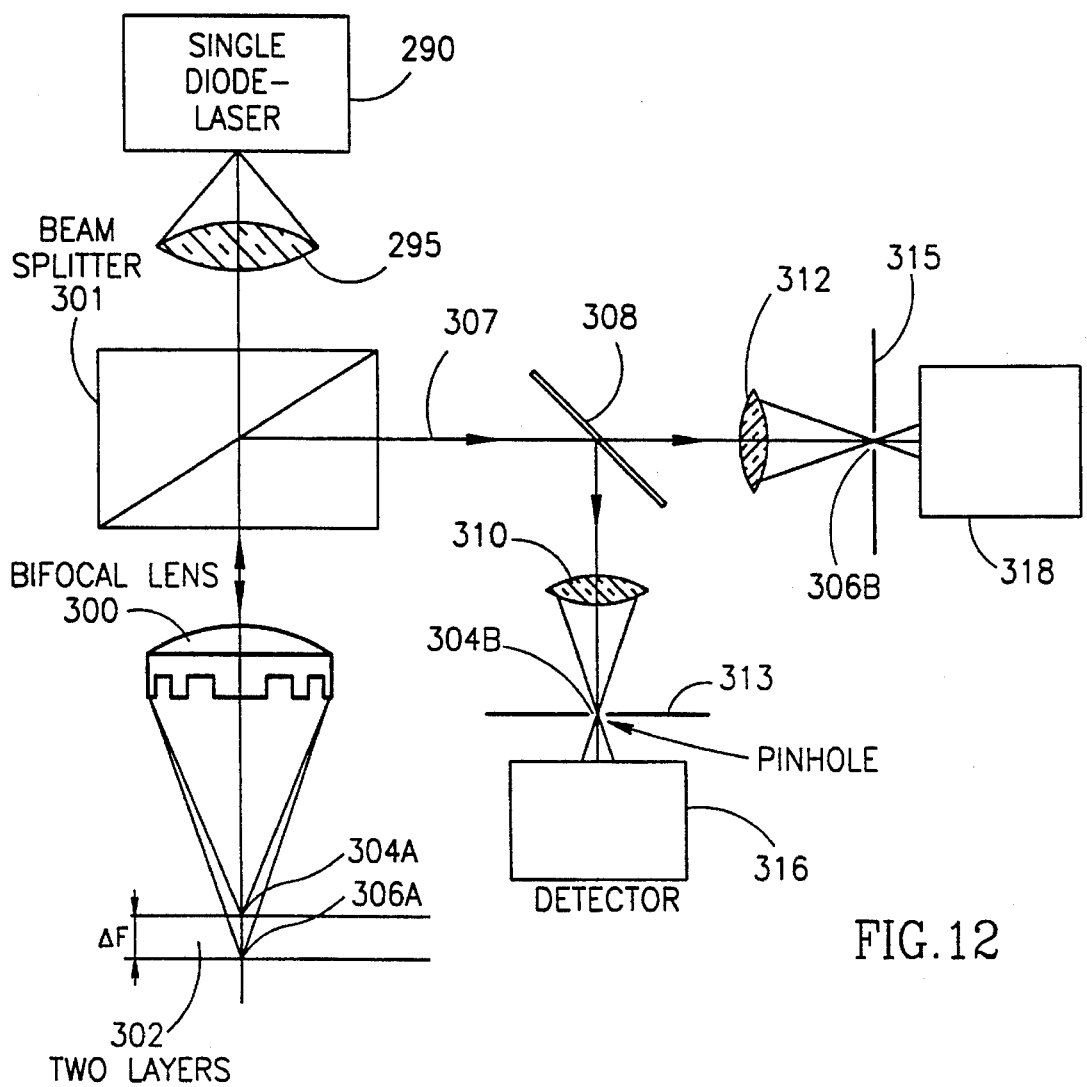
FIG. 12 illustrates a readout principle which is based on single diode laser, bifocal focusing element and the confocal technique.

An alternative embodiment for the optical storage system is illustrated in FIG. 12. Using this embodiment it is possible to simultaneously read out two layers of an optical disk assembly using a single diode laser 290 rather than two diode lasers as in the previously described embodiments. The beam emitted by the diode laser passes through the collimating lens, 295, and is focused, using a bifocal focusing element 300, on the double layer optical disk 302, which are partially transparent, as with the configuration illustrated in FIG. 8. The result is two focused spots, one for each layer. The bifocal focusing element is based on a hybrid diffractive-refractive element which is described below.

FIG. 12 illustrates two focused spots denoted by 304A, 306A. The backwards reflected beams 307 which are directed towards the output by beam-splitter 301 are separated by beam-splitters 308. The reflected beams are focused by the lenses 310 and 312 to spots 304B and 306B, where the pinholes 313 and 315 are located. In order to exploit the confocal configuration, the spot 304B must be taken as the exact image of the spot 304A (while spot 306B is the image of 306A). The detectors 316 and 318 detect all the light passing through the pinholes, resulting in the simultaneous readout of information from each of the two layers with maximum signal to noise ratio.

The bifocal element is realized by combining a refractive lens and a diffractive element which diffracts the light to two orders, rather than just one. The relative intensity distribution of the diffracted orders depends on the shape and depth of the grooves of the surface relief diffractive element. As mentioned previously, for obtaining only the first diffracted order, it is necessary to resort to kinoform having blazed relief grating where the relief height, corresponding to a phase of $2\pi$, is given by $d=\lambda/\Delta n$ with $\Delta n$ being the relief modulating refractive index change for the transmissive elements.

In the scalar region, when a diffractive element is illuminated with a normally incident plane wave, the output wave front will have the same form as the diffractive element, given by, $$H=\exp[iF(\phi)] \qquad \{11\}$$

where $\phi$ is the desired phase function, and $F(\phi)$ is the actual phase function of the diffractive element. $F(\phi)$ is periodic in $\phi$, so one can expand H in a Fourier series. The Fourier expansion of Eq. {11} is given by, $$\exp[iF(\phi)]=\Sigma C_m \exp[im\phi] \qquad \{12\}$$

where the summation is from m=$-\infty$ to $\infty$, and where $C_m$ is the $m^{th}$ order coefficient of the Fourier expansion, given by $$C_m=(1/2\pi)\int_0^{2\pi} \exp[iF(\phi)-im\phi]d\phi \qquad \{13\}$$

The diffraction efficiency, $\eta_m$, of the $m^{th}$ diffracted order is given by $$\eta_m=|C_m|^2/\Sigma|C_k|^2 \qquad \{14\}$$

where the summation is from k=$-\infty$ to $\infty$, for a pure phase element, which is the case for elements $\Sigma|C_k|^2=1$, where the summation is from k=$-\infty$ to $\infty$.

Figure 13:
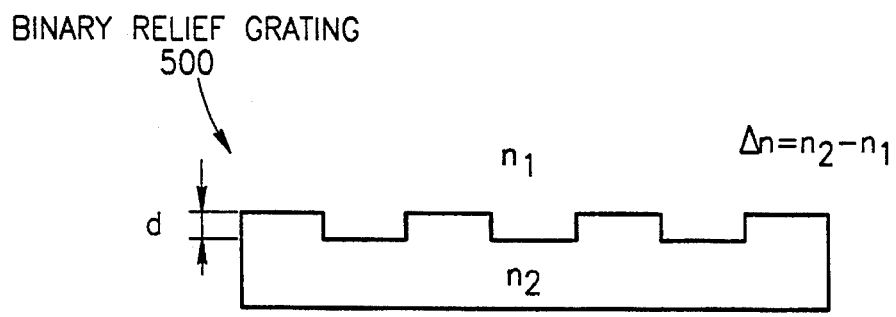
FIG. 13 illustrates a binary relief grating.

For simplicity, one can consider the possibility of using binary relief grating, i.e., with two levels. In order to insert a binary phase function in Eq. {13} and for a particular case, where the duty cycle of the fringes is equal to 0.5, the intensity diffraction efficiency of the $m^{th}$ order (using Eq. {14} is,
for m≠0

$$\eta_m=\{[(-1)^m-1]^2/(m\pi)^2\}\sin^2[(\pi\Delta nd)/\lambda] \qquad \{15\}$$

for m=0

$$\eta_0=1-\sin^2[(\pi\Delta nd)/\lambda] \qquad \{16\}$$

where d is the relief height and $\Delta n$ is the relief modulation refractive index change. FIG. 13 illustrates a typical binary relief grating denoted by 500, where $n_2$ is the refractive index of the substrate and $n_1$ is the refractive index of the air i.e. $n_1$=1.

For obtaining two diffracted orders, m=1,−1, the optimal depth d will be $d=\lambda/(2\Delta n)$. Thus, the resulting intensity diffraction efficiencies are $\eta_0$=0%, $\eta_1$=40.5%, $\eta_{-1}$=40.5%.

In order to form a bifocal element, a quadratic phase function is taken for the diffractive element, resulting in an output phase function of the $1^{th}$ diffracted order as, $$\phi_m = m\phi = -\pi(x^2+y^2)/[\lambda(f_d/m)] \quad \{17\}$$

Eq. {17} yields the well known result that the focal length of the $m^{th}$ diffracted order is given by, $$(f_d)_m = f_d/m \quad \{18\}$$

If one assumes negligible separation between the refractive and diffractive elements, one can resort to the simple lens combination equation, $$1/F_m = 1/f_r + 1/(f_d)_m \quad \{19\}$$

where $F_m$ is the focal distance ($m^{th}$ order) of the combined lens, and $f_r$ is the focal distance of the refractive lens. Using Eq. {19} yields the relation for the multifocal length, $$F_m = f_r f_d/(f_d + m f_r) \quad \{20\}$$

In the particular case illustrated in FIG. 12, two orders, m=1, m=−1, are used where the distance between the two adjacent focal planes is given by, $$\Delta z = \Delta F = (F_{-1} - F_1) = 2 f_r^2 f_d/(f_d^2 - f_r^2) \quad \{21\}$$

For example, if one is interested in $\Delta z \approx 1$ mm then, by using Eq. {21}, one finds that $f_r = 8$ mm yields $f_d = 130$ mm.

In order to read out the information of m=1 and m=−1 diffracted orders which are illustrated in FIG. 12 by the focused spots 304A and 306A respectively, it is necessary to take into consideration the backwards diffracted orders. The backward spherical reflected beams emerging from the focused spots 304A and 306A impinge on the bifocal element 300, and are divided between the m=1 and m=−1 orders; i.e., the two optical powers of the bifocal element ($1/F_1$, $1/F_{-1}$, Eq. {19}) act on them.

By using Eq. {19} and the well-known object-image relation, it can be shown that in order to discriminate between the two layers it is necessary to image the focused spots 304A (m=1) by exploiting the backward diffracted beam, and for the spot 306A (m=−1) to use the m=1 backward diffracted beam.

It is to be noted that in this readout configuration the relevant backward beams are not collimated. Thus, it is not possible to use the proposed scanning concept which is described in FIG. 11.

Finally, the configuration of FIG. 12, which is based on a bifocal focusing element and a single diode laser, is simpler and cheaper to realize than the wavelength multiplexing configuration described previously. Unfortunately, the configuration features a reduced signal to noise ratio. Nevertheless, it may be more cost-effective for simultaneous readout of two layers in the optical disk in certain applications.

In addition, a focus error detection as well as a tracking error detection should be considered in the readout optical system. This can be done by additional splitting of the reflected beams and using astigmatic lens and a quad-optical detector, (U.S. Pat No. 5,255,262 and E. Hasman, N. Davidson, A. A. Friesem, "Multifunctional holographic element for surface measurements", Opt. Eng. 31, 1992).

The optimization of power efficiency of such an optical system is very important. For this, it is possible to use polarized beams (of the diode lasers) and to insert a polarized beam-splitter (such as beam-splitters 90 and 302 shown in FIGS. 9A and 12, respectively). In addition, by inserting achromatic λ/4 retarder between the beam-splitter and the optical disk, the overall efficiency can be increased. Illustrative of a typical achromatic retarder is a birefringent polymer produced by Meadowlark Optics.

While the invention has been described with respect to a limited number of embodiments, it will be appreciated that many variations, modifications and other applications of the invention may be made.

What is claimed is:

1. A multilayer optical disk system, comprising:
   (a) an optical disk unit including a plurality of connected optical disks;
   (b) a plurality of light sources for providing a plurality of light beams of different wavelengths;
   (c) a wavelength multiplexer for combining said plurality of light beams into a single beam;
   (d) axially dispersing optics for simultaneously focusing said single beam onto two or more of said optical disks;
   (e) a wavelength demultiplexer for splitting light reflected from said two or more of said optical disks according to wavelength to produce two or more separate beams; and
   (f) a plurality of detectors, each of said detectors detecting one of said two or more separate beams.

2. The system of claim 1, further comprising confocal imaging optics through which said separate beams are passed prior to their introduction to said plurality of detectors.

3. The system of claim 1, wherein said axially dispersing optics includes an on-axis diffractive optical element.

4. The system of claim 1, wherein said axially dispersing optics includes a hybrid diffractive-refractive optical element.

5. The system of claim 1, wherein said axially dispersing optics includes one or more diffractive optical elements and further includes one or more refractive optical elements.

6. The system of claim 1, wherein said plurality of light sources include diode lasers.

7. The system of claim 1, further comprising a beam-splitter for reflecting said light reflected from said two or more of said optical disks to said wavelength demultiplexer.

8. The system of claim 1, wherein said wavelength multiplexer includes one or more dichroic beam-splitters.

9. The system of claim 1, wherein said wavelength multiplexer includes one or more holographic optical elements.

10. The system of claim 1, wherein said wavelength multiplexer includes prisms assembly with wavelength selective coatings.

11. The system of claim 1, wherein said wavelength multiplexer includes one or more diffractive optical elements and further includes one or more refractive optical elements.

12. The system of claim 1, wherein said wavelength demultiplexer includes one or more dichroic beam-splitters.

13. The system of claim 1, wherein said wavelength demultiplexer includes one or more hybrid diffractive-refractive optical elements.

14. The system of claim 1, wherein said wavelength demultiplexer includes one or more diffractive optical elements and further includes one or more refractive optical elements.

15. The system of claim 1, wherein said wavelength demultiplexer includes one or more holographic optical elements.

16. The system of claim 1, wherein said wavelength demultiplexer includes a prisms assembly with wavelenght selective coatings.

17. The system of claim 1, wherein at least one of said plurality of optical disks is wavelength selective.

18. The system of claim 1, wherein at least one of said plurality of optical disks is partially transparent.

19. The system of claim 1, wherein at least one of said plurality of optical disks features read only memory.

20. The system of claim 1, wherein at least one of said plurality of optical disks features writable memory.

21. The system of claim 1, wherein at least one of said plurality of optical disks features writable and erasable memory.

22. The system of claim 1, further comprising a plurality of pinholes confocal filters for receiving said separate beams from said wavelength demultiplexer prior to said separate beam impinging on said plurality of detectors.

23. The system of claim 1, further comprising a common confocal filter for receiving said light reflected from said two or more of said optical disks prior to said light reaching said wavelength demultiplexer.

24. The system of claim 1, further comprising a focusing optical member through which said plurality of light beams is passed to said axially dispersing optics and through which said light reflected from said two or more of said optical disks is passed to said wavelength demultiplexer, wherein said focusing optical member and said axially dispersing optics are mounted for radial movement while said light sources, said wavelength multiplexer, said wavelength demultiplexer and said detectors are stationary.

25. The system of claim 24, wherein said focusing optical member is a penta prism.

26. The system of claim 24, wherein said focusing optical member is a regular prism.

27. The system of claim 24, wherein said focusing optical member is a mirror reflecting at right angle.

28. A two-layer optical disk system, comprising:
   (a) an optical disk unit including a pair of connected optical disks, at least one of said optical disks being partially transparent;
   (b) a single light source for providing a light beam;
   (c) an axially dispersing bifocal focusing element for simultaneously focusing said light beam onto said pair of optical disks;
   (d) a beam-splitter for splitting light reflected from said pair of optical disks to produce two separate beams; and
   (e) a pair of detectors, each of said detectors detecting one of said two separate beams.

29. The system of claim 28, further comprising a confocal imaging optic located between said beam-splitter and said pair of detectors.

30. The system of claim 28, wherein said bifocal focusing element includes a hybrid diffractive-refractive element.

31. The system of claim 28, wherein said bifocal focusing element includes one or more diffractive optical elements and further includes one or more refractive optical elements.

32. A method for simultaneously reading a plurality of optical disks of a multilayer optical disk system, comprising the steps of:
   (a) providing a plurality of light beams of different wavelengths;
   (b) combining said plurality of light beams into a single beam;
   (c) axially dispersing said single beam so as to simultaneously focus said single beam onto two or more optical disks of an optical disk unit including a plurality of connected optical disks;
   (d) splitting light reflected from said two or more of said optical disks according to wavelength to produce two or more separate beams; and
   (e) separately detecting said two or more separate beams.

33. The method of claim 32, wherein said separate detection is effected using a confocal imaging optic.

34. A method for simultaneously reading both optical disks of a two-layer optical disk system, comprising the steps of:
   (a) providing a single light beam;
   (b) axially dispersing, using a bifocal focusing element, said single beam so as to simultaneously focus said light beam onto the two optical disks of the two-layer optical disk system, at least one of said disks being partially transparent;
   (d) splitting light reflected from said two of said optical disks to produce two separate beams; and
   (e) separately detecting said two separate beams.

35. The method of claim 34, wherein said separate detection is effected using a confocal imaging optic.

* * * * *